United States Patent

[11] 3,617,888

[72] Inventors George M. Hanus
Norridge;
Alfred R. Lucas, Northbrook; Frank R. Skutta, Mount Prospect, all of Ill.

[21] Appl. No. 848,200

[22] Filed Aug. 7, 1969

[45] Patented Nov. 2, 1971

[73] Assignee Motorola, Inc.
Franklin Park, Ill.

[54] ENCODER-DECODER DEVICE FOR SELECTIVE SIGNALLING

15 Claims, 1 Drawing Fig.

[52] U.S. Cl. .......... 325/18, 325/55, 325/64, 325/468, 340/171

[51] Int. Cl. .......... H04b 1/48

[50] Field of Search .......... 325/18, 21, 22, 55, 64, 392, 466, 468; 340/171; 343/175, 180

[56] References Cited

UNITED STATES PATENTS

| | | | |
|---|---|---|---|
| 3,292,085 | 12/1966 | Black .......... | 325/18 |
| 3,441,854 | 4/1969 | Cole .......... | 325/18 |

*Primary Examiner*—Benedict V. Safourek
*Assistant Examiner*—Kenneth W. Weinstein
*Attorney*—Mueller and Aichele

ABSTRACT: A tone signal encoder-decoder circuit uses an amplifier and a single tuned circuit for decoding and encoding a tone signal. A switching network enables a feedback circuit to cause operation of the circuit as an encoder and disables the feedback circuit to cause operation as a decoder. The DC operating levels for the circuit are increased and the source of operating potential for the frequency-responsive unit of the circuit operates through a higher impedance in the encoder mode. A provision also is made for facilitating rapid start for the encoding oscillator unit. Switching from the decoder to the encoder mode also disables the decoder mode preamplifier circuit and changes the biasing level of the detector to increase the threshold thereof when the circuit is in the encode mode of operation. A final provision is made for causing the radio receiver with which the circuit is employed to have the audio portion thereof selectively controlled by the output of the detector in the encoder-decoder circuit or the output of the normal receiver squelch circuit or a combination of the outputs of the squelch circuit and the detector at the option of the operator of the receiver.

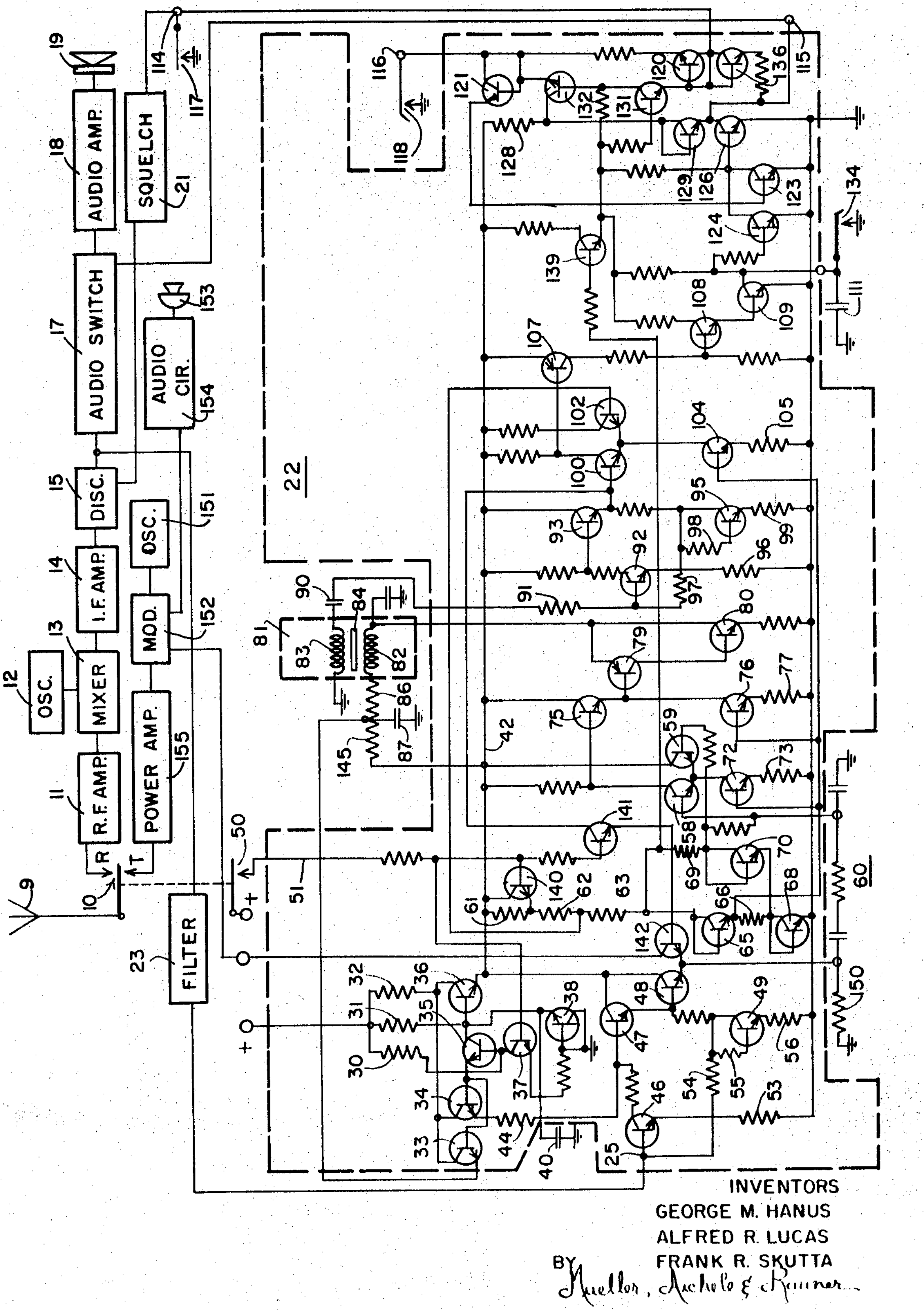
INVENTORS
GEORGE M. HANUS
ALFRED R. LUCAS
FRANK R. SKUTTA
BY Mueller, Aichele & Rauner
ATTYS

ENCODER-DECODER DEVICE FOR SELECTIVE SIGNALLING

BACKGROUND OF THE INVENTION

Two-way portable radio equipment providing both transmitting and receiving functions in a single unit requires simple and dependable circuitry in the form of a compact and rugged unit. In addition, optimum portability necessitates that the equipment be small and light in weight for easy handling and, if possible, be of such a size that it may be hand held, but incorporating all of the features of much larger transmitter-receiver units. Among the features which may be incorporated in a transmitter-receiver of this type is a squelch system which maintains the audio portion of the receiver cutoff until a carrier signal is received by the receiver.

The difficulties in achieving these optimum conditions are increased when additional features are required, such as encoded tone systems in which the receivers are responsive only to messages transmitted in connection with a coded tone of the particular frequency. Coded tone operation, however, requires a tone source such as an oscillator for the transmitting function to provide the tone of the particular frequency which is transmitted to the receivers, and further requires a frequency-responsive device in each receiver that causes the receiver in which it is incorporated to operate upon receipt of the coded tone signals only. By using different tones for different receivers, it is possible for a transmitter operator to select particular receivers; and only the selected receivers are capable of picking up the transmitted message. Thus a receiver operator does not have to listen to all the traffic transmitted on a particular frequency but only receives those messages addressed to his particular receiver.

Tone-operated squelch systems have been incorporated in prior art transmitter-receivers by the use of a single circuit as both the encoder and decoder circuit. When operating as a decoder circuit, the detected tone signal is coupled to a frequency-selective circuit which produces an output only if the tone signal is of the predetermined frequency. The output signal from the frequency-selective circuit then is coupled to the audio portion of the receiver to energize the audio portion. When the circuit is operating as an encoder, the output circuit from the frequency-selective circuit is coupled back to the input of the frequency-selective circuit to form a feedback oscillator. Thus, it is necessary to switch the signal paths in the encoder-decoder portion depending upon the circuit operation desired.

Because of the high feedback when the circuit is operating in the encoder mode, it generally is desirable that the circuit have a lower gain than when it is operating in the decoder mode. Nevertheless, because the time required for oscillations to build up in the oscillator to a usable amplitude may be undesirably long if the gain of the circuit is at the reduced level, it is important that the gain of the circuit when the encoder is initially energized be as high as possible so that oscillations may build up rapidly. After oscillations build up to the desired level, the circuit gain should be reduced in order to minimize distortion. In order to obtain the desired output signals from a single circuit acting as an encoder and a decoder, it has been necessary to provide additional switches for carrying out the encoder-decoder circuit functions. In order to maintain the small size required for a miniature hand-held transmitter receiver, however, a minimum number of switching components should be used and they should be as small as possible. Preferably the switching components should be in the form of electronic circuits rather than in the form of mechanical switches since the former may be more readily implemented in a miniature form.

SUMMARY OF THE INVENTION

Accordingly it is an object of this invention to provide an improved tone signal encoder-decoder circuit for a transmitter-receiver.

It is another object of this invention to combine encoder and decoder systems in improved circuitry in a two-way portable radio unit adapted for coded-tone operation.

It is a further object of this invention to change the DC operating levels of a combination encoder-decoder device depending upon the mode of operation of the device.

It is an additional object of this invention to cause the operating voltage for the tone signal generating portion of an encoder-decoder circuit for a transmitter-receiver to be supplied through a higher impedance for operation of the circuit in the encoder mode than for operation in the decoder mode to insure the starting of oscillation with the operating voltage being reduced after oscillation starts and during operation of the circuit in a decoder mode of operation.

In accordance with a preferred embodiment of this invention, a two-way radio apparatus is provided with a squelch circuit and a combination encoder-decoder device. The encoder-decoder device is comprised of a preamplifier and an amplifier limiter stage coupled to the input of a frequency-responsive unit which incorporates a mechanically resonant member responsive to a tone signal of the particular frequency. With the device operating as a decoder, audio signals from the receiver of the radio apparatus are applied to the preamplifier stage and are amplified to drive the frequency-responsive unit. When tone signals of the predetermined frequency are received, the frequency-responsive unit provides an output signal which is detected by a detector to provide a control signal to the squelch circuit to unsquelch the receiver.

When the mode select switch is placed in the encode mode of operation, the operating bias for the preamplifier stage is removed thereby disabling the preamplifier. At the same time, the threshold of the detector is increased so that output signals from the frequency-responsive unit no longer are passed by the detector. In addition, the source of current for the frequency-responsive device is changed from a relatively low-impedance path to a high-impedance path, with a provision being made for causing a higher operating potential to be applied to the frequency-responsive device upon initial switching into the encode mode, whereupon after a predetermined length of time, the potential applied to the frequency-responsive device is reduced to hold the oscillations at the desired level. When the device operates in the encode mode, a feedback path is established by providing an operating bias to a direct-coupled transistor to complete the feedback from the output of the frequency-responsive unit to the input of an amplifier limiter stage of the device.

An additional feature is provided in the form of a gating circuit at the output of the device for causing the operation of the receiver squelch to be controlled by either the normal noise squelch for the receiver or the received tone, or controlled by both the noise squelch and the received tone at the option of the operator of the radio with which the device is employed.

BRIEF DESCRIPTION OF THE DRAWING

The sole FIGURE of the drawing is a schematic diagram, partially in block form, of a two-way radio receiver incorporating an encoder-decoder device in accordance with a preferred embodiment of the invention.

DETAILED DESCRIPTION

Referring now to the drawing, there is shown a two-way radio transmitter-receiver system incorporating a preferred embodiment of the invention. When the radio is operated in its receive mode, radiofrequency signals are applied from an antenna 9 through the then closed upper contact of a receive/transmit switch 10 to a radiofrequency amplifier 11. The signals are heterodyned with oscillations from a local oscillator 12 in a mixer 13 to produce intermediate frequency signals which are amplified in an intermediate frequency amplifier 14. The signals from the output of the amplifier 14 are applied to a discriminator circuit 15 which provides audio output signals through an audio switch 17 to an audio amplifier 18 to produce the amplified audio signals supplied to an output loudspeaker 19.

The audio switch 17 is operated to pass or block the output of the discriminator 15 to the audio amplifier 18 under the control of a squelch circuit 21 and an encoder-decoder circuit 22 shown in dotted lines on the drawing. When a carrier signal is received having a sufficient magnitude to open the squelch circuit 21 and also modulated with the tone to which the receiver is responsive, the audio switch 17 is closed to permit the passage of the signals from the output of the discriminator 15 to the audio output amplifier 18. For other conditions of operation, the audio switch 17 is opened to prevent the passage of such signals.

With the circuit being operated in the receive mode, signals obtained from the output of the receiver discriminator 15 are applied through a wave-shaping filter 23 to an input terminal 25 for the encoder-decoder control circuit 22 of the receiver. The encoder-decoder circuit 22 is fabricated on a single integrated circuit chip, with all of the integrated circuit components being indicated on the drawing as enclosed in the dotted line.

The encoder-decoder circuit is designed to operate with a nominal 14-volt B+ supply applied to three dropping resistors 30, 31 and 32 which are connected to six NPN-transistors 33, 34, 35, 36, 37 and 38, which comprise the voltage regulation circuitry of the system. The transistor 38 has a shorted collector base interconnection, with the collector being connected to ground and the emitter thereof being connected to the resistor 31; so that the transistor 38 is operated as a Zener diode to provide a regulated DC potential which is substantially unchanged with variations in the B+ supply applied to the circuit externally. Any Zener noise generated by the transistor diode 38 is removed by an external capacitor 40 connected between the emitter of the transistor diode 38 and ground. The potential present on the emitter of the transistor diode 38 is utilized as the biasing potential on the base of the transistor 36, the emitter of which supplies the regulated DC operating potential to the major B+ bus 42 for the circuit.

The potential on the emitter of the transistor Zener diode 38 also establishes the voltage on the collector of the transistor 35, the base of which is supplied with operating potential through the resistor 30, with the transistor 35 in turn establishing the base bias potential on the control transistors 33 and 34. The transistor 34 is used to supply operating bias through a resistor 44 to a four-transistor preamplifier circuit including the transistors 46, 47, 48 and 49. By providing the operating bias for the preamplifier circuit in this manner, isolation of this high-gain portion from the rest of the circuitry is provided; and in addition, by utilizing the transistor 34 as a switch, it is possible to turn off the preamplifier circuit when the system is operated in the encode or transmit mode.

When the receiver is in the receive or decode mode, a "-push-to-talk" switch 50 is ganged to the switch 10, both of which are in the upper positions as shown. With the switch 50 in the upper position, an open circuit is present on a lead 51, and the receiver circuit detects the presence of low-frequency modulation on the carrier at a particular tone frequency and unsquelches the audio circuit if this tone is received. When the circuit is in the receive or decode mode, the transistor 37 in the voltage regulator circuit is nonconductive, and the output of the filter circuit 23 is applied to the input terminal 25 connected to the base of the input preamplifier transistor 46.

Four resistors 53, 54, 55 and 56 are provided with values such that the emitter currents of the preamplifier transistors 46 and 49 are equal to establish the DC output voltage of the preamplifier circuit at a predetermined desired level. The input signals applied to the terminal 25 are amplified by the transistor 46 and are applied to the Darlington amplifier transistors 47 and 48. The emitter output of the transistor 48 is coupled to a limiter amplifier differential circuit, consisting of a pair of transistors 58 and 59, through a load-coupling circuit 60 which is externally connected between a pair of output terminals on the integrated circuit chip.

The differential amplifier 58 and 59 is provided with a threshold potential on the base of the transistor 59 from a voltage divider reference string including resistors 61, 62, 63, 66 and diode transistors 65 and 68 connected between the B+ bus 42 and ground. The diode transistor 65 and resistor 66 are connected in parallel with a series-connected resistor 69 and diode transistor 70, with the junction between the resistor 69 and diode transistor 70 providing the threshold bias to the base of the amplifier limiter transistor 59. This bias is fixed by the diode transistors 68 and and 70 at two diode voltage drops above ground potential. A constant current source for the transistors 58 and 59 is provided by an NPN-transistor 72 connected between the emitters of the transistors 58 and 59 and a resistor 73 to ground. The operating level of the transistor 72 is established from the junction of the diode transistor 65 and the resistor 66 of the reference string. This point also is utilized to supply the bias for the current sources of other differential amplifiers in the circuit.

Peak-to-peak drive of the limiter circuit is established by the magnitude of the current flowing from the emitters of the transistors 58 and 59 and is determined by the value of the resistor 73. The signal obtained from the output at the collector of the transistor 58 then is coupled directly to the base of an NPN-transistor 75 constituting an emitter-follower input transistor in the reed driver circuit. A current source load for the transistor 75 is established through a transistor 76 and a resistor 77, with the transistor 76 being biased by the potential present at the junction of the diode transistor 65 and resistor 66.

The output of the emitter-follower transistor 75 is applied to a composite PNP-NPN-emitter-follower circuit in the form of a pair of transistors 79 and 80, with the PNP-transistor 79 being used in order to properly reference the drive to B+ and the composite of the transistors 79 and 80 being necessary in the integrated circuit in order to realize adequate current gain. One side of the primary coil 82 of a reed filter 81 is coupled to the junction of the emitter of the transistor 79 and collector of the transistor 80 to provide tone signals of the desired frequency to the coil 82. These received tone signals cause mechanical vibrations of a reed 84, thereby coupling energy to an output coil 83 of the filter 81. Tone signals which are not of the desired frequency are highly attenuated by the reed filter 81 and are not coupled to the output coil 83.

The source of operating current for the primary winding 82 of the reed filter 81 is obtained from the emitter of the regulated voltage supply transistor 33 through a relatively low-impedance resistor 86 (approximately 680 ohms) connected in series with the primary winding 82. The resistor 86 provides an external means of adjusting the reed overdrive. Since the reed overdrive is intimately connected with the reed startup time and the falsing rate of the circuit, the overdrive is adjusted with due consideration to both of these parameters in a known manner. The potential applied from the emitter of the transistor 33 to the resistor 86 also is used to charge a storage capacitor 87 to the value of this potential.

The tone signals of the desired frequency, recovered at the secondary winding 83 of the reed filter circuit 81, are coupled through a coupling capacitor 90 and a resistor 91 to the base of an input transistor 92 of a reed output preamplifier circuit including the transistor 92 and additional transistors 93 and 95. This preamplifier circuit is biased in the same manner as the preamplifier consisting of the transistors 46, 47, 48 and 49 by resistors 96, 97, 98 and 99; so that the emitter current of the transistors 92 and 95 is equal. In addition, the DC level at the emitter of the transistor 93, when it is in the encode mode, is approximately at the same DC level as the emitter of the transistor 47 in the decode mode.

The biasing provided for the transistors 92, 93 and 95 also establishes a fixed DC voltage at the base of an input transistor 100, forming one of a pair of transistors 100 and 102 in a differential amplifier detector circuit. The threshold level for the detector circuit 100, 102 is established by the DC potential at the junction of the resistors 62 and 63 which is applied to the base of the transistor 102, causing the transistor 102 to be normally on. A constant current source in the form of a transistor 104 connected between a common emitter resistor 105 and the emitters of the transistors 100 and 102 is provided, with the DC operating bias for the transistor 104 being obtained from the junction between the diode transistor 65 and the resistor 66. X The tone signal amplified by the preamplifier transistors 92 and 93 is applied from the emitter of the transistor 93 to the base of the transistor 100; and when the signal at the base of the transistor 100 rises above the base voltage of the transistor 102, the transistor 100 is rendered conductive, which in turn biases into conduction an amplifier 107 and a Darlington pair of transistors 108 and 109. A capacitor 111 is connected between ground and the collector of the Darlington output transistor 109 in order to filter out the voltage spikes which occur due to the presence of the tone signal, and the capacitor 111 is charged to a voltage equivalent to $V_{sat}$ of the transistor 109 when the tone signal is present. When no tone signal is present, the transistor 109 is nonconductive so that the capacitor 111 is charged to a higher, more positive voltage.

The circuitry following the filter capacitor 111 and connected to the collector of the Darlington output transistor 109 constitutes a logic-switching circuit for controlling the operation of the audio switch 17 according to the user's need. The DC information from the noise squelch circuit 21 in the radio receiver is applied to a terminal 114 to interact with the tone signal output within the logic circuitry to produce the appropriate audio switch operating signal at an output terminal 115. The receiver audio should be squelched, that is, the audio switch 17 should be opened, when current (approximately 150 $\mu$A.) flows from the terminal 115. This occurs when the terminal 115 is at a positive potential.

Control of the audio switch 17 can be either by the output of the squelch circuit 21, or by the output of the transistor 109, or by a combination of both of these output signals in accordance with the setting of the logic circuitry. When it is desired to cause the operation of the audio switch 17 to be under control of both the output of the squelch circuit 21 and the output of the tone detection circuit obtained from the collector of the Darlington output transistor 109, a pair of control switches 117 and 118, connected to the terminals 114 and 116, respectively, are opened. When this is done, the output of the squelch circuit 21 applied to the terminal 114 is passed through a pair of transistor diodes 120 and 121 to the base of an NPN-transistor 123 which is connected in a common collector configuration with a transistor 124, the base of which is supplied with signals from the collector of the Darlington amplifier transistor 109. The transistors 123 and 124 connected in this manner operate as an "AND" gate to supply control signals to the base of an NPN-transistor 126 which operates to supply the output signals to the terminal 115 for controlling the squelch or operation of the audio switch 17. The emitter of the transistor 126 is connected to ground and the collector is connected to the DC supply bus 42 through a collector resistor 128 and a transistor diode 129.

The absence of a positive base drive potential to both of the transistors 123 and 124 is required in order to turn the audio switch 17 on, that is, both the transistors 123 and 124 must be rendered nonconductive indicating that both the tone is present (transistor 109 conductive) and the carrier is present (a ground or negative output from the squelch circuit 21). In such an event, the transistor 126 is rendered conductive to cause ground potential to appear on the output terminal 115.

If it is desired to cause the operation of the audio switch 17 to be solely under the control of the tone detection circuit, the switch 117 is closed and the switch 118 is left open. With the switch 117 closed the terminal 114 is tied directly to ground causing a control transistor 131 to be driven into saturation which in turn maintains a second control transistor 132 in a nonconductive state, causing a current path to be maintained through the resistor 128 and the transistor diode 129 to the output terminal 115. With this current path present, the control signal at the terminal 115 is controlled solely by the signals present at the output of the tone detection circuit in transistor 109 since the transistor 123 is rendered nonconductive and conduction of the transistor 124 is controlled by the transistor 109 which then controls the conduction of the transistor 126.

If it is desired to cause the operation of the audio switch 17 to be solely under the control of the squelch circuit 21, thereby disabling the tone control squelch circuit provided by the circuit 22, the switches 117 and 118 both are opened. An additional switch 134 connected across the capacitor 111 is closed, however, to cause the potential at the base of the transistor 124 to be maintained at ground, thereby rendering the transistor 124 nonconductive and insensitive to the output signals obtained at the collector of the transistor 109. In this state of operation, the operation of the audio switch 17 then is controlled directly from the output of the squelch circuit 21, controlling the conduction of the transistor 123 in the manner described previously.

To cause the operation of the audio switch 17 to be controlled by the squelch circuit 21 or the tone detection circuit, the switches 117 and 134 are open and the switch 118 is closed. This applies ground potential through the transistor diode 121 to the base of the transistor 123, rendering the transistor 123 nonconductive. At the same time, the transistor 132 is rendered conductive to eliminate the current path through the diode transistor 129 to the collector of the transistor 126. With this path eliminated, the current that controls the audio switch 17 comes directly from the noise squelch input through a transistor diode 136. The terminal 115 is prevented from being held at ground potential by the isolation provided by the transistor diode 129. Whenever a tone is detected, the transistor 124 is rendered nonconductive, as described previously, which causes the transistor 126 to conduct, shunting the output terminal 115 to ground. Thus, the circuit operates as an "OR" gate, applying ground potential to the terminal 115 when either a tone or a carrier is detected.

With both of the switches 117 and 118 closed and the switch 134 open, the transistor 131 saturates, rendering the transistor 132 nonconductive. This then restores the current path through the resistor 128 and transistor diode 129 to the output terminal 115. With this path restored and the output of the squelch circuit 21 tied to ground, control of the audio switch 17 is effected solely by the operation of the tone signal indicating transistor 109 which controls the operation of the transistors 124 and 126.

It should be noted that the collector potential for the transistors 123 and 124, which in turn forms the biasing potential on the base of the transistor 126, is obtained from a constant voltage source in the form of a transistor 139, the base of which is supplied with a constant DC biasing potential obtained from the junction of the diode transistor 65 and the resistor 63.

When the circuit is operated in the encode mode, the switches 10 and 50 are closed to their lower contacts so that the receiving portion of the radio is disconnected from the antenna 9, connecting the transmitting portion thereto; and a positive potential is applied over the lead 51 to the encode-decode module 22. This positive potential forward biases the transistors 37, 140, 141 and 142 into a state of conduction.

When the transistor 37 is rendered conductive, it causes near ground potential to be applied to the base of the transistor 35, rendering the transistor 35 nonconductive, which in turn causes the transistors 33 and 34 to be rendered nonconductive. This turns off the preamplifier including the transistors 46, 47, 48 and 49 since no B+ is applied to this portion of the circuit with the transistor 34 nonconductive. The turning off of the transistor 33 also removes the application of the B+ supply from the emitter of the transistor 33 to the junction of the resistor 86 and capacitor 87, causing the B+ for the primary winding 82 of the reed circuit 81 now to be obtained from the bus 42 through a high-impedance resistor 145 (approximately 39K ohms). Thus, the current drive for the primary winding of the reed 84 is reduced by the resistor 145 to establish the overshoot of the reed which in turn effects the reed's startup time.

Rendering conductive the transistor 140 causes an effective short circuit to be placed across the resistor 61 in the reference voltage bias string so that the reference voltages obtained from this bias string rise to higher values. Thus, the current source transistors 72, 76 and 104 are rendered more conductive. Since the bias on the base of the transistor 59 remains the same, the clipping level of the amplifier-limiter circuit 58, 59 is changed to provide a step-up in current from the output of the reed driver transistors 75, 79, 80. This increased reed driver current results in a current spike in the reed primary 82 which speeds up the starting of oscillation of the reed 84. This current spike, operating in conjunction with the charge stored on the capacitor 87 during the decode mode, causes a relatively high current initially to be applied through the primary winding 82 for a period of time sufficient to discharge the capacitor 87, permitting rapid buildup of oscillations of the reed circuit 81. This high initial current is in excess of the decoder mode current; but once the oscillations have been built up, the supply of current to the reed takes place through the high-impedance path including the resistors 86 and 145. This causes a lower current then to be applied through the winding 82 for the encode mode than for the decode mode. As a result, overdriving of the tuned circuit 81 is prevented when the circuit is operated as an oscillator. If this were not done, the strong feedback signals might overtax the components of the oscillator circuit.

Of course, if the system were operated at the bias potential of the decoder operation, the oscillations also would build up rapidly, but the oscillations could build up to such a high amplitude as to shift the resonant frequency of the device, which is the reason for operating the device at a lower current through the primary winding 82 in the encoder mode.

It should be noted that, by raising the bias voltages of the string 62, 63, 65, 66 and 68, the bias voltage obtained from the junction of the resistors 62, 63 and applied to the base of the threshold transistor 102 in the detector also rises. This causes the detector reference voltage to be established at a sufficiently high voltage to disable the detector, since the signal levels applied to the base of the transistor 100 are insufficient to overcome this increased bias on the base of the transistor 102.

Any disturbance in the reed 84 of the frequency-responsive circuit 81 causes signals in the winding 83 which continue to be amplified by the preamplifier circuit consisting of the transistors 92, 93 and 95. These amplified signals now, however, are blocked by the detector 100, 102 but are fed back from the emitter of the transistor 93 to the collector of the switching transistor 141 which has been saturated by the DC biasing potential applied to its base when the switch 50 was closed to the transmit mode.

The variations in the collector potential of the transistor 141 obtained from the emitter of the transistor 93 appear on the emitter of the transistor 141 and are applied to the base of the 0 tone control output transistor 142, the collector of which supplies the desired tone frequency signal used to encode the transmission from the radio. At the same time, the feedback loop is completed by the transistor 141 through the emitter of the transistor 142, since the emitter of the transistor 142 is connected through the coupling circuit 60 back to the input at the base of the transistor 58 in the amplifier limiter stage of the circuit. The load signal for the emitter of the transistor 142 appears across the load resistor 150 in the coupling circuit 60. Since the energy is fed to the reed secondary winding 83 only at the reed frequency, an oscillator at the reed frequency thus exists when the circuit is placed in the transmit mode.

The transmitter section of the radio includes an oscillator 151 which applies high-frequency signals to a modulator 152. A microphone 153 applies audio signals to an amplifier and processing unit 154 also connected to the modulator 152. The frequency-modulated signals at the output of the modulator 152 then are applied to a power amplifier 155 which raises the level of the signals to the desired value. The signals then are applied to the antenna 9 through the switch 10 and are transmitted. In addition to the signals obtained from the output of the audio circuit 154 and applied to the modulator 152, the coded tone signal present on the collector of the transistor 142 also is applied to the modulator 152 to modulate the transmitted signal with the coded tone in addition to the modulations obtained from the output of the audio circuit 154. The integrated circuit encoder-decoder described above provides a compact system which may be readily utilized in a hand-held transmitter receiver. In addition, the circuit is temperature stable and provides a very rapid start-up time (approximately 16.8 ms.) when switching from the decode to the encode mode. In addition, the biasing of the tone output circuit is achieved very rapidly since the quiescent operating points for the transistors 48 and 142 in the decode and encode modes, respectively, are substantially the same. The utilization of electronic switching devices permits the use of a single mechanical transmit-receive switch for changing the modes of operation of the decoder-encoder circuit, and the squelching control switches permit flexible utilization of the system in a number of different modes of operation at the option of the user.

We claim:

1. A combination encoder-decoder device for use in selective signalling two-way radio apparatus and operable in encoder mode to provide tone oscillations and in decoder mode to provide a control signal in response to a received tone, said device including in combination:

an amplifier;

a frequency-responsive unit coupled to the output of the amplifier and providing a control signal for the receiver upon receipt of signals of a predetermined frequency from the amplifier;

means for providing a first predetermined operating current to the frequency-responsive unit for decoder operation;

switch means selectively operable to feed back signals from the frequency-responsive unit to the input of the amplifier for operation in an encoder mode;

means for changing the operating current applied to the frequency-responsive unit to a second predetermined operating current when the device is operating in its encoder mode, the second predetermined operating current being less than the first predetermined operating current; and means for changing the operating current applied to the frequency-responsive unit to a third predetermined operating current for a period of time after the switch means is operated to permit oscillations to build up to a desired amplitude, the third predetermined operating current initially being greater than the first predetermined operating current.

2. The combination according to claim 1 wherein the third operating current decays from a value initially greater than the first operating current to the value of the second predetermined operating current over said period of time.

3. The combination according to claim 1 wherein the frequency-responsive unit includes driving means, sensing means and vibratory means for coupling the driving means to the sensing means in response to a predetermined frequency, the amplifier being connected to drive the driving means, with the first predetermined operating current being applied from a source of potential through a first impedance means to the driving means, wherein the means for changing the operating current to said second predetermined current applies current to the driving means from the source of potential through a second impedance means, and wherein the means for changing the operating current to said third operating current includes storage means connected to the first impedance means and means for increasing the drive of the amplifier, the storage means operating in conjunction with the amplifier to provide said third operating current for said period of time.

4. The combination according to claim 3 wherein the values of the first and second impedance means are chosen such that said second operating current applied to the driving means through the second impedance means is less than said first operating current applied to the driving means through the first impedance means, and wherein said third operating current initially is greater than the first and second operating currents.

5. The combination according to claim 4 wherein the first impedance means includes a first resistor connected to the driving means and to the source of potential through a switching device, wherein the second impedance means includes a second resistor connected between the source of potential and the junction of the first resistor with the switching device, so that with the switching device closed, current is supplied to the driving means from the source of potential through the first resistor and with the switching device opened current is supplied from the source of potential through the first and second resistors constituting the second impedance means, the combination further wherein the storage means is a capacitor connected between the junction of the first and second resistors and a point of reference potential.

6. The combination according to claim 5 wherein the switch means and the switching device are transistor switches, with the switch means being nonconductive in the decoder mode and the switching device transistor being nonconductive in the decoder mode and the switching device transistor being conductive in the decoder mode and further including means for switching operation of the apparatus from a decoder mode to an encoder mode causing the switch means transistor to be rendered conductive and the switching device transistor to be rendered nonconductive.

7. A combination encoder-decoder device for use in a selective signalling two-way radio apparatus and operable in encoder mode to provide tone oscillations and in decoder mode to provide a control signal in response to a received tone, said device including in combination:

a first amplifier;

a frequency-responsive unit coupled to the output of the first amplifier and providing a control signal for the receiver upon receipt of signals of a predetermined frequency from the first amplifier;

a second amplifier;

bias circuit means for providing operating voltages for the first and second amplifiers, input signals from the radio apparatus operated in a decoder mode being applied to the input of the second amplifier, the output of the second amplifier forming the input signals for the first amplifier;

switch means selectively operable in an encoder mode to feed back signals from the frequency-responsive unit to the input of the first amplifier; and control means for changing the operating voltage for the first amplifier, operating the switch means, and for disabling the operating voltage for the second amplifier to thereby change operation of the device from a decoder mode to an encoder mode.

8. The combination according to claim 7 wherein the frequency-responsive unit has driving means, sensing means and vibratory means for coupling the driving means to the sensing means in response to a predetermined frequency, with the first amplifier connected to drive the driving means, the combination further including a third amplifier coupled to the sensing means for providing a control signal for the receiver in the decoder mode and for providing a feedback signal to the switching means in an encoder mode, the second and third amplifiers being matched so that the operating level of the signals applied to the input of the first amplifier is maintained substantially the same in both the encoder and decoder modes of operation.

9. The combination according to claim 8 wherein said first, second and third amplifier circuits all are formed as part of the same integrated circuit chip to thereby cause the desired matching and also to provide temperature compensation.

10. A combination encoder-decoder device for use in selective signalling two-way radio apparatus and operable in an encoder mode to provide tone oscillations and in decoder mode to provide a control signal in response to a received tone, the device including in combination:

an amplifier;

a frequency-responsive unit coupled to the output of the amplifier and providing an output signal for the receiver upon receipt of signals of a predetermined frequency from the amplifier;

a detector;

means for establishing a threshold of a predetermined magnitude for the detector, the detector being responsive to the output signals from the frequency-responsive unit in excess of said predetermined magnitude for providing a control signal for the receiver;

means for changing operation of the device from a decoder mode of operation to an encoder of operation; and means responsive to the mode-changing means operating from a decoder to an encoder mode for changing the threshold of the detector to a higher level so that no control signals are obtained from the output thereof when the device is operating in an encoder mode of operation.

11. The combination according to claim 10 wherein the detector is an integrated circuit transistor differential amplifier detector having a first threshold established by a first predetermined threshold-establishing potential when the device is in its decoder mode of operation and whereupon switching of the device to its encoder mode of operation causes the threshold-establishing potential applied to the differential detector to be increased by a predetermined amount sufficient to prevent operation of the detector by the output of the frequency-responsive unit.

12. A combination encoder-decoder device for use in a selective-signalling two-way radio apparatus and operable in an encoder mode to provide tone oscillations and in decoder mode to provide a control signal in response to a received tone, said radio apparatus including in the receiving portion thereof an audio portion and a squelch circuit providing an output indicative of the presence or absence of a received carrier, said device including in combination;

an amplifier;

a frequency-responsive unit coupled to the output of the amplifier and providing said control signal for the receiver upon receipt of signals of a predetermined frequency from the amplifier;

programmable gating means having as input signals thereto the control signal and the output of the squelch circuit and providing an output signal for controlling the operation of the audio portion of the radio receiver; and means for setting the gating means to cause the output signal for controlling the audio portion to be a function of one of the output of the squelch circuit only, the control signal only, a combination of the control signal and the output of the squelch circuit, the output of the squelch circuit or the control signal.

13. A combination encoder-decoder device for use in a selective-signalling two-way radio apparatus and operable in an encoder mode to provide tone oscillations and in a decoder mode to provide a control signal in response to a received tone, said radio apparatus including in the receiving portion thereof an audio portion and a squelch circuit providing an output indicative of the presence or absence of a received carrier, said device including in combination:

a first amplifier;

a frequency-responsive unit coupled to the output of the first amplifier and providing an output upon receipt of signals of a predetermined frequency from the first amplifier;

a second amplifier;

a detector;

means for establishing a threshold of a predetermined magnitude for the detector, the detector being responsive to the output of the frequency-responsive unit in excess of said predetermined magnitude for providing a control signal;

switch means selectively operable to feed back signals from the frequency-responsive unit to the input of the first amplifier for operation in an encoder mode;

bias circuit means for providing operating voltages for the first and second amplifiers, input signals from the radio apparatus operated in a decoder mode being applied to the input of the second amplifier, the output of the second amplifier forming the input signals for the first amplifier;

means for providing a first predetermined operating current to the frequency-responsive unit for decoder operation;

control means operable for changing the operating voltage for the first amplifier, operating the switch means, and for disabling the operating voltage for the second amplifier, thereby switching control of the signals applied to the first amplifier from the output of the second amplifier to the feedback signals obtained from the switch means;

means responsive to the operation of the control means for changing the operating current applied to the frequency-responsive unit to a second predetermined operating current when the device is operating in its encoder mode;

means for causing the operating current applied to the frequency-responsive unit to be a third predetermined operating current for a period of time after the switch means is operated to permit oscillations to build up to a desired amplitude; and means responsive to operation of the control for changing the threshold of the detector to a magnitude greater than said predetermined magnitude to prevent control signals from being obtained from the output thereof when the device is operating in an encoder mode of operation.

14. The combination according to claim 13 further including 1 and the output of the squelch circuit and providing an output signal for controlling the operation of the audio portion of the radio receiver; and means for setting the gating means to cause the output signal for controlling the audio portion to be a function of one of: the output of the squelch circuit only, the control signal only, a combination of the control signal and the output of the squelch circuit, the output of the squelch circuit or the control signal.

15. The combination according to claim 13 wherein the device is formed on a single integrated circuit chip.

* * * * *